Oct. 2, 1956     W. K. ROBBINS     2,765,017

NUT WITH RESILIENT, BITING TOOTH LOCKING MEANS

Filed Jan. 2, 1952

INVENTOR.
W. K. Robbins
BY
Eugene E. Stevens
ATTORNEY.

United States Patent Office 2,765,017
Patented Oct. 2, 1956

2,765,017

NUT WITH RESILIENT, BITING TOOTH LOCKING MEANS

William Kalleen Robbins, Milwaukee, Wis.

Application January 2, 1952, Serial No. 264,490

6 Claims. (Cl. 151—37)

This invention relates to novel improvements in nut locks.

Heretofore it has been the practice to employ lock washers under the heads of nuts and the like, but such washers are jammed tight against the surface of a substructure opposed to the nut. Consequently, when subjected to vibration, the washers have a tendency to work loose from the locked surface.

The principal object of the present invention is to provide a nut lock having a novel spring locking washer mounted thereon which resiliently engages the surface of a substructure opposed to the nut and locks the nut thereagainst.

Another object is the provision of a nut lock having a spring locking washer secured thereto and wherein means are provided on the nut and washer to enable the latter to resiliently engage the surface of a substructure opposed to the nut whereby the nut and washer will not work loose under vibration.

Still another object is the provision of a spring locking washer fixedly secured to a nut lock wherein the nut is recessed to accommodate the flexible free end of the washer thereby permitting the latter to resiliently engage the surface of a substructure opposed to the nut to prevent the same working loose under vibration.

A further object is to provide a nut lock having a spring locking washer fixedly secured to the underside thereof and which nut is recessed to receive a bent free end of the washer in such a manner that the bent end will firmly engage the surface of a substructure opposed to the nut under spring tension so as to require a hard pull to be imparted to the nut for loosening thereof.

These and other objects of the invention will be apparent by referring to the accompanying drawings, wherein Figure 1 is a side elevation of the lock nut and washer, showing the same in position on a bolt, with the nut and washer being in position preparatory to being tightened;

Figure 1:
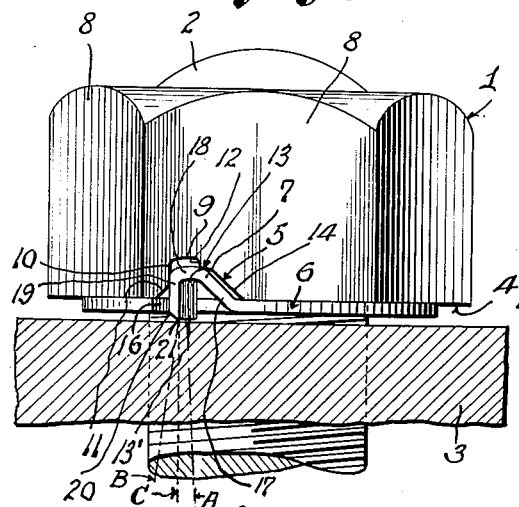

Referring more particularly to the drawings, wherein like reference characters designate similar parts throughout the several views, a nut 1 of any desired shape is internally threaded to threadedly engage a bolt or stud 2 extending through a substructure 3 against which the nut is adapted to be locked.

The flattened underside 4 of the nut is provided with a recess 5 suitably formed therein to accommodate a bent end 7 of a circular flat spring locking washer 6. The recess 5 extends substantially radially across the face of the nut from the threaded bore to the annulus thereof and is located at a point adjacent the intersection between two of the flat side faces 8 of the nut. In order for the recess to accommodate the bent end of the washer so that the latter will function in a manner hereinafter described, the recess 5 is formed with a reduced relatively shallow groove or pocket 9 at its upper end, with one wall 10 thereof being vertical and thence flaring or tapering downwardly and laterally, as at 11. The other vertical wall 12 of the groove 9 is somewhat shorter in length and extends laterally to provide a relatively narrow substantially flat shoulder 13. Extending downwardly and laterally at an angle from the shoulder 13 to the flat underside of the nut is a substantially flat wall 14.

Suitably secured to the flat underside 4 of the nut by spot welding or the like at three spaced points 15 is the circular washer 6 which is split, as at 16, so that the washer flatly and snugly engages the nut. The bent end 7 of the washer is of substantially inverted U-form and is formed with an upwardly and angularly extending substantially flat leg 17 of a length substantially coinciding with the length of nut recess wall 14. At the upper end of the bent end 7 is bent laterally to provide a bight portion 18, and thence is bent downwardly to provide the leg 19. The downwardly extending leg 19 normally projects slightly below the underside of the washer 6 and is tapered, as at 20, to provide a pointed end 21 which engages with the upper surface of the substructure 3 being clamped when the nut and washer are in the Figure 2 locking position.

As the bent end 7 of the washer is spaced from the nearest attaching spot weld 15, the same freely extends into the recess 5. Due to the configuration of the recess 5, it will be noted that the angular leg 17 lies substantially parallel with the angular wall 14 of the recess 5 and that an end area of the bight wall 18 which is carried by washer leg 17 abuts the flat shoulder 13 of the nut recess so that the shoulder edge 13′ acts as a fulcrum point for the bight 18 inwardly of its junction with leg 17 of the U-end 7, as will hereinafter be described. In the Figure 1 unlocked position, the upper end of the vertical or downwardly depending leg 19 of the washer engages the vertical wall 10 of the shallow groove 9, and the lower end of the leg is spaced from the tapered wall 11 of the recess 5. When the nut is rotated to the Figure 2 locking position and pulled down to the substructure 3, the pointed end 21 of leg 19 engages the surface 3 and continued rotation of the nut will apply tension to the bent inverted U-form washer end 7. This tension causes the bight wall portion 18 which is to the left (Fig. 2) of shoulder edge 13′ to move clockwise about the latter as a fulcrum whereby the pointed end 21 will move from its dotted center line C to the dotted line position A, as indicated in Figure 1. Thus, in the locked Figure 2 position, the washer will abut the surface 3 and the pointed end 21 will firmly engage the surface 3 under spring tension and acts as a positive lock to prevent the nut from becoming loose on the bolt. When sufficient tension is applied, it will be apparent that the leg 19 carried end of bight 18 will move upwardly into the shallow groove 9. When the nut is initially backed off or loosened, by rotating the same in a reverse direction, the pointed end 21 and the depending leg 19 will tend to move to the left, as shown in Figure 3 and by the dotted line position B of Figure 1, during which movement the flared lower wall 11 of the recess 5 will afford clearance for the leg 19. Upon continued reverse rotation of the nut to entirely loosen the parts, it will be understood that the leg 19 will again assume its vertical or dotted line C position of Fig. 1.

Figure 5:
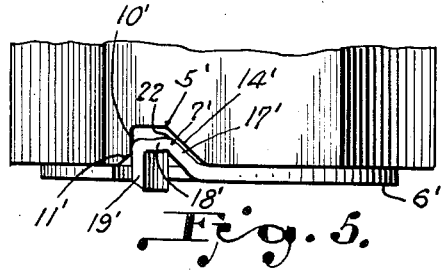
Figure 5 is a side elevation of a nut lock and washer, with the nut broken away, showing a modified form of nut locking recess and bent free end of the spring locking washer.

A modified form of nut recess 5' and spring locking washer 6' is illustrated in Figure 5. The recess 5' in the nut corresponds to that previously described except that the flat shoulder 13, fulcrum point 13' and the perpendicular groove or pocket wall 12 are omitted therefrom, and the inclined wall 14' extends all the way to the inner end of the reduced or pocket end of recess 5'.

As shown in Fig. 5, the bight 18' of the inverted and substantially U-form washer end 7' is transversely bent adjacent its junction with the flat and inclined washer-carried leg 17' to provide with said leg a slightly raised and arch-form hump 22 which extends inwardly of the plane of the upper surface of said leg 17'.

Figure 2:
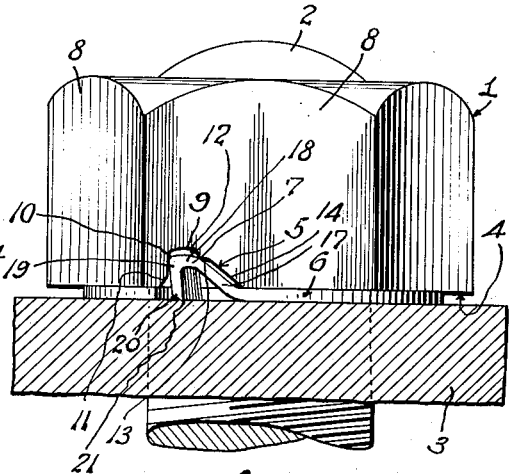
Figure 2 is a side elevation of the lock nut and washer positioned on a bolt and showing the relative positions of the nut and washer when tightened against the surface of the material to which it is pressed.
Figure 3:
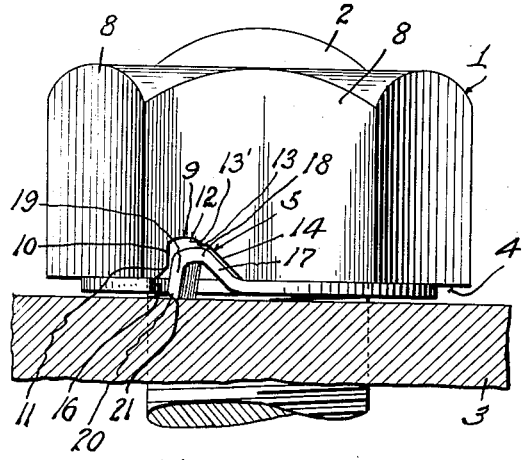
Figure 3 is a side elevation of the lock nut and washer positioned on a bolt and showing the relative positions of the nut and washer after the latter has been loosened or backed off relative to the surface of the material against which it is pressed.
Figure 4:
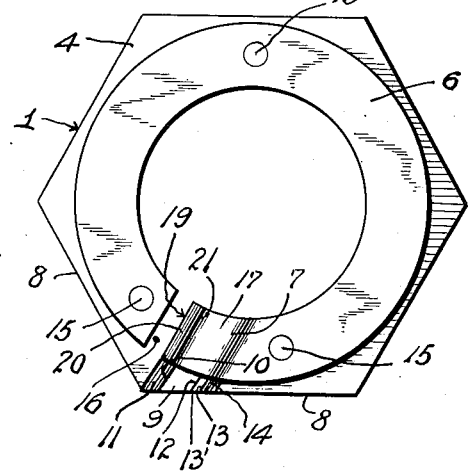
Figure 4 is a bottom plan view showing the spring locking washer assembled thereon.

The arch-form hump 22 is the functional Fig. 5 equivalent of the bight 18 end-overlying shoulder 13 of Figs. 1–4, inclusive, in that both function to provide resistance to clockwise swinging of the respective bights 18', 18 under the upward pressure which is applied thereto by the locking legs 19', 19 when the lower ends of the latter are forced against the substructure such as 3 in Figs. 1, 2 and 3. Thus, in Figs. 1–3, the positioning of the shoulder-provided fulcruming edge 13' inwardly of the plane of the leg 17 effects resistance to the upward pressure exerted by leg 19 by shortening the bight 18 distance between said leg 19 and the fulcruming shoulder edge 13'. Then in the Fig. 5 form of the invention, wherein the bight 18' end is fulcrumed against the overlying inclined wall 14, equivalent bight resistance to upward pressure from leg 19' is effected by providing said bight 18' with the arch form hump 22 adjacent said recess wall 14'. Wall portions 10' and 11' in Fig. 5 correspond to those indicated at 10 and 11, respectively, in Figs. 1–4.

Figure 6:
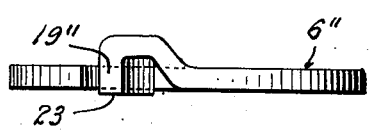
Figure 6 is a side elevation of a spring locking washer embodying a further modified form of locking point.

A further modified form of spring locking washer 6" is shown in Figure 6, wherein a heavier type of spring washer is utilized and the bent end therein corresponds with the preferred form illustrated in Figures 1 to 3. In lieu of the lower end of the leg 19" being pointed, as in the preferred form, this end is formed with a substantially flat portion 23 which contacts the surface 3 under sufficient spring tension and will have sufficient drag to prevent the nut from working loose.

It will be understood that in my lock nut construction, the spring washer is always resilient even when the nut is jammed tight against the substructure 3 and an extra hard pull on the nut will be required to free the latter, as the spring point 21 must be forced over the center line C. Thus, both the nut and bolt head can be locked and the spring tension, which is always present, will not loosen under vibration. This is advantageous and desirable because the possibility of the bolt threads being damaged will be avoided or materially minimized thereby permitting of the nut being repeatedly used.

While I have shown and described a preferred form and two modifications of my invention, it will be understood that various changes and improvements may be made therein without departing from the scope of the appended claims.

What I claim is:

1. A nut lock comprising a nut having a threaded bore and providing a surface recess in its underside at one side of said bore, said recess providing spacedly opposed wall portions extending crosswise of the turning path of the nut, the recess being of minor depth as compared to the nut thickness, and all areas of said wall portions extending outwardly toward the nut side in substantially parallel lines; said recess further having an upper end reduction produced by spacement of said wall portions, the one of said wall portions which is located in the direction of nut-tightening turning movement providing a locking member-sustaining shoulder which is substantially parallel with the nut axis and extends upwardly from adjacent the lower end of said recess reduction at least part way to the upper end of the latter; the other one of said recess wall portions being inclined substantially from the under nut side toward said first-mentioned wall portion and the upper end of said recess, a locking member of stiff but resilient material having a main body portion secured to and overlying the underside of the nut at the opposite side of said recess from said shoulder-providing wall portion, said member providing a free end inverted U-like end portion having its bight extending into said recess reduction, said U-like end portion providing a free depending locking leg engaging said recess wall-provided shoulder and having a substructure-engaging terminal extending below the plane of the underside of said nut, and the other leg of said U-like end portion being shorter than the depth of said recess, said last mentioned leg at the site of the bight underlying a portion of said second-mentioned recess wall so as to cooperate with the latter in the provision of a fulcrum point and to limit initial insertion of said bight to a point thereon short of the inner end of said recess reduction, whereby to leave a space into which the locking leg end of said bight can be moved under pressure.

2. The combination set forth in claim 1 and a projection carried by one of said second-mentioned recess wall and bight end portions and engaging the other of same to establish a pivot point.

3. The combination set forth in claim 1, and the lower end of said first-mentioned recess wall portion being inclined in the direction of tightening turning travel of the nut whereby to provide a relief space into which the lower end of said locking leg can move when the nut is turned in the reverse or loosening direction.

4. The combination set forth in claim 1, and the lower end of said first-mentioned recess wall portion being inclined in the direction of tightening turning travel of the nut whereby to provide a relief space into which the lower end of said locking leg can move when the nut is turned in the reverse or loosening direction, and a projection carried by one of said second-mentioned recess wall and bight portions and engaging the other of same to establish a pivot point.

5. The combination set forth in claim 1, and a bight end-engaging fulcruming projection carried by said second-mentioned recess wall.

6. The combination set forth in claim 1, and a hump-like projection carried by said bight end and engaging the adjacent second-mentioned recess wall to establish a pivot point.

References Cited in the file of this patent

UNITED STATES PATENTS

| | | |
|---|---|---|
| 204,731 | Hill | June 11, 1878 |
| 256,169 | Sherman | Apr. 11, 1882 |
| 690,344 | Baldwin | Dec. 31, 1901 |
| 737,044 | Thorne | Aug. 25, 1903 |
| 763,932 | Schofield | June 28, 1904 |
| 971,784 | Pfister | Oct. 4, 1910 |
| 1,269,386 | Carlson | June 11, 1918 |

FOREIGN PATENTS

| | | |
|---|---|---|
| 8,777 of 1911 | Great Britain | Dec. 30, 1911 |